United States Patent [19]

Carter et al.

[11] Patent Number: 5,027,909

[45] Date of Patent: Jul. 2, 1991

[54] TOOL HOLDING APPARATUS

[75] Inventors: Thomas J. Carter, Utica; Ronald B. Michalski, Troy; Robert W. Cetnarowski, Pearl Beach, all of Mich.

[73] Assignee: Utica Enterprises, Inc., Sterling Heights, Mich.

[21] Appl. No.: 333,640

[22] Filed: Apr. 5, 1989

[51] Int. Cl.⁵ ............................................... E21B 1/00
[52] U.S. Cl. ........................................ 173/52; 901/19; 901/25
[58] Field of Search .................... 414/751; 901/14, 19, 901/25; 173/52, 50

[56] References Cited

U.S. PATENT DOCUMENTS 4,215,611 8/1980 Dahms .................................. 83/623

*Primary Examiner*—Joseph M. Gorski
*Assistant Examiner*—Willmon Fridie, Jr.
*Attorney, Agent, or Firm*—Remy J. VanOphem

[57] ABSTRACT

An apparatus for providing a reciprocating motion. The apparatus has a housing block that contains two movable arms in spaced apart relationship to one another. The movable arms each contain a rack gear connected to a common pinion gear. One movable arm is driven by a fluid actuated cylinder. The driven movable arm then produces an equal and opposite motion in the other arm because of the interconnection of the pinion gear. Tools for altering of a workpiece may be attached to one or both ends of the movable arms. An embodiment utilizes the rotation of the pinion gear shaft to cause a translation of the entire apparatus away from a workpiece.

19 Claims, 3 Drawing Sheets

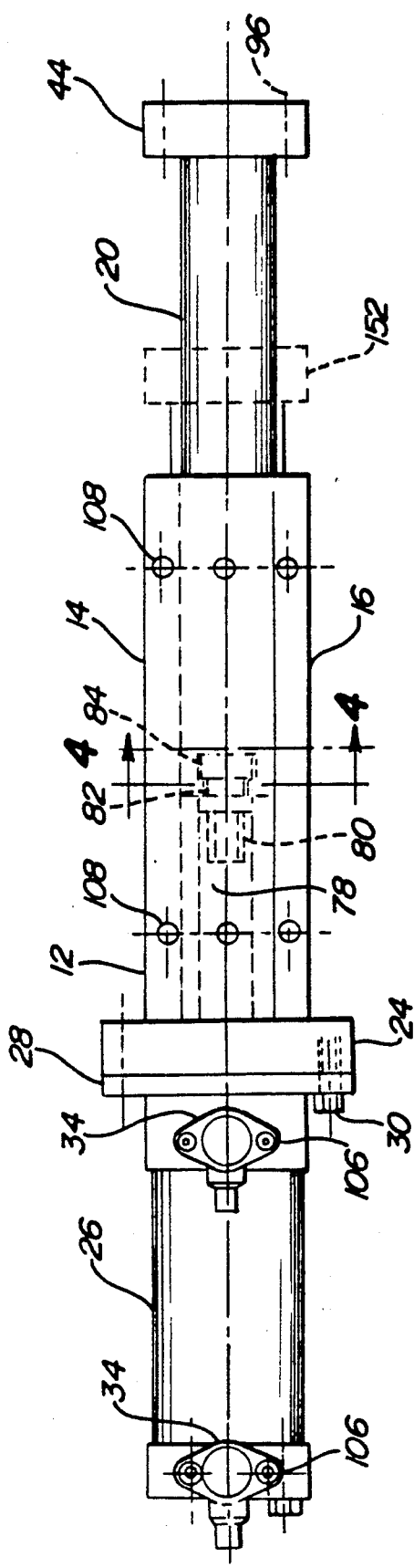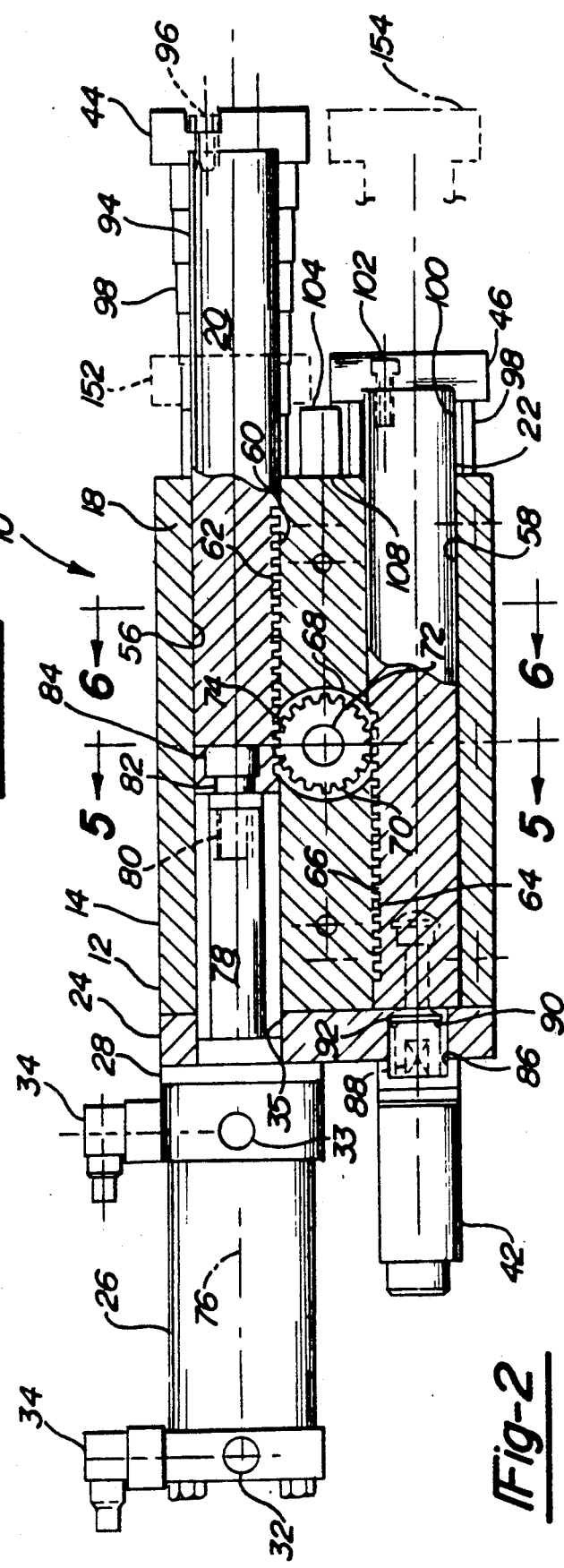

TOOL HOLDING APPARATUS

BACKGROUND OF THE INVENTION

1. Field of the Invention

The present invention relates to an actuator powered apparatus that has application for clamping, welding and other assembly functions that are common in the manufacture and assembly of vehicles, such as automobiles. More particularly, the invention is related to a dual action actuator powered apparatus that is equipped with two elongate arms that are spaced apart from one another. The elongate arms each have a rack gear that meshes with a pinion gear that is interengaged with both rack gears. The elongate arms are positioned within a common housing that supports fluid driven cylinders that are attached to each elongate arm.

2. Description of the Prior Art

The prior art discloses a variety of devices that employ the rack and gear combination to change arcuate motion to a translatory function, or vice versa. In general, most of the prior art devices utilize the pinion gear shaft to supply power to the device or else take power out via the pinion shaft. The prior art devices employ a rack gear that is formed from plate or bar stock as well as a cylindrical rod.

The present invention differs from the rack and pinion gear driven load grip device that is shown and described in U.S. Pat. No. 2,595,131 entitled "Load Grip Means for Trucks and the Like" issued Apr. 29, 1952, to Leslie G. Ehmann. FIG. 1 of the Ehmann patent depicts a pair of spaced apart cylinders 26 that are oriented parallel to one other. In cross section, the cylinders are square in configuration and have a cylindrical bore located along the longitudinal axis of the cylinder. One of the four sides of each cylinder contains a rack gear. The rack gears of the cylinders mesh with the teeth of a pinion gear that is attached to a flange. Each one of the cylinders is powered by a piston that is connected to a piston rod. The piston and the piston rod are contained within the cylinder in the usual fashion, with only the end of the piston rod protruding from the cylinder. The ends of the piston rods are fixed, thus, when fluid pressure is applied to the piston head, the cylinder with its attached rack gear moves in a linear direction. The pinion gear is fixed against rotation by its attached flange. Consequently, when fluid pressure is applied to the piston heads, the rack gear containing cylinders walk around the teeth of the fixed pinion gear. In this manner, a torque is developed to rotate the entire plate t which the cylinders and their accompanying pistons are attached.

The present invention differs from the above described device in that the power generating fluid driven cylinders are separate from the rods or elongated arms that contain the rack gear teeth. Thus, any malfunction of the piston head, or its seals, does not affect the block assembly that houses the elongated arms.

In U.S. Pat. No. 3,018,885 entitled "Extrusion and Stretch-Straightening Apparatus and Method" issued Jan. 30, 1962, to Leonard H. Trautman, there is shown an apparatus for stretching a metal rod subsequent to its formation by an extrusion process. The metal rod is grasped at both ends and then elongated to remove any non-linear sections that ma have resulted because of the extrusion process. The grasping of the rod is achieved by a pair of jaws that move into engagement with opposed sides of the rod. As shown in FIG. 3 of the drawings, the jaws are each attached to an elongated bar that has a rack gear formed on the end of the bar that is remote from the clamp jaw. The rack gears are positioned opposed to one another in spaced apart relationship with an idler pinion gear positioned therebetween. One of the elongate bars is attached to a fluid driven cylinder 42. The reciprocating action of the fluid cylinder 42 causes the jaws, which are attached to the elongate bars, to move into and out of engagement with the workpiece.

Thus, the present invention differs from the previously described metal stretching apparatus in that the elongate arms are linear in configuration and are confined within a block that has precisely aligned grooves.

In a somewhat similar application, the rack and pinion gear assembly shown in FIG. 5 of U.S. Pat. No. 3,752,062 entitled "Apparatus for Bonding Brake Linings" issued Aug. 14, 1973, to Thomas E. Morgan, Sr. et al, utilizes a pair of opposed elongated rods to control the movement of bars 134 and 136. The elongated rods each have rack gears that engage a common idler pinion gear. A lever having a centrally disposed fulcrum is attached to an end of one elongated rod. The lever is also attached to a fluid driven cylinder 168. Thus, movement of the actuator rod in the fluid driven cylinder 168 will cause the attached elongated rod and rack gear to move in the opposite direction. The present invention is an improvement over the aforementioned apparatus in that there is no lever arm positioned between the fluid driven cylinder and the rack gear. Then, too, the present invention provides for rapid disengagement of the cylinder rod from the rack gear assembly.

SUMMARY OF THE PRESENT INVENTION

The present invention is a dual action fluid actuated device for use in a variety of applications where a generally linear equal and opposite compressive or tensile force is applied to shape, form or hold a workpiece.

The invention includes a housing of elongated block configuration that contains two spaced apart elongated arm guides in the form of grooves. The elongated ar guides traverse the entire length of the housing and are open at their opposite ends. Each one of the elongated arm guides within the housing contains an elongate arm. The elongate arms each contain a gear segment in the form of a rack gear that extends over a portion of the longitudinal extent of the elongate arms. A pinion gear is mounted for rotation within the housing and is positioned intermediate the two elongated arm guides. The teeth of the pinion gear extend into each of the elongated arm guides within the housing and mesh with the teeth of each elongate arm rack gear. At least one end of one elongated arm protrudes from the housing and contains one or more tools affixed thereto. A fluid driven cylinder is attached to the housing in line with the elongate arm. A cylinder rod is coupled to the elongate arm to control the linear motion thereof. A fluid ingress and egress is provided for the cylinder so that fluid pressure will cause the cylinder rod to move which in turn controls the movement of the elongate arm. The movement of one elongate arm in one direction causes an equal and opposite movement in the other elongate arm because of the interconnection of the pinion gear. Reversal of the fluid pressure within the cylinder causes the elongate arms to reverse their directions and either engage o retract one or more tools from contact with a workpiece.

A primary object of the present invention is to provide a force generating dual action apparatus that is accurate and can function with a variety of tools attached thereto.

Another object of the present invention is to provide an apparatus that uses a double rack and pinion gear to produce equal and opposite forces to move tools into and out of engagement with a workpiece.

A further object of the present invention is to provide a force generating dual action apparatus that can be driven by different fluid mediums.

Another object of the present invention is to provide an apparatus that contains two elongate arms that move in opposite directions when a force generated by a fluid cylinder is applied to at least one of the elongate arms.

Still another object of the present invention is to provide a tool carrying apparatus that contains a minimum of moving parts and seals.

A further object of the present invention is to reduce the work cycle time in that both elongate arms move tools or clamps simultaneously into and out of engagement with a workpiece.

Another object of the present invention is to eliminate the whipping or arcing movements associated with non-linear motion devices.

A further object of the present invention is to provide an apparatus having increased smoothness of performance.

Further objects and advantages of the present invention will become apparent from the following description and the appended claims, reference being made to the accompanying drawings forming a part of this specification, wherein like reference characters designate corresponding parts in several views.

BRIEF DESCRIPTION OF THE DRAWINGS

FIG. 2 is a cross-sectional side view, showing the rack containing elongate arms and their interconnection to one another;

FIG. 3 is a top plan view of the apparatus depicted in FIG. 2;

DETAILED DESCRIPTION OF THE PREFERRED EMBODIMENT

Figure 1:
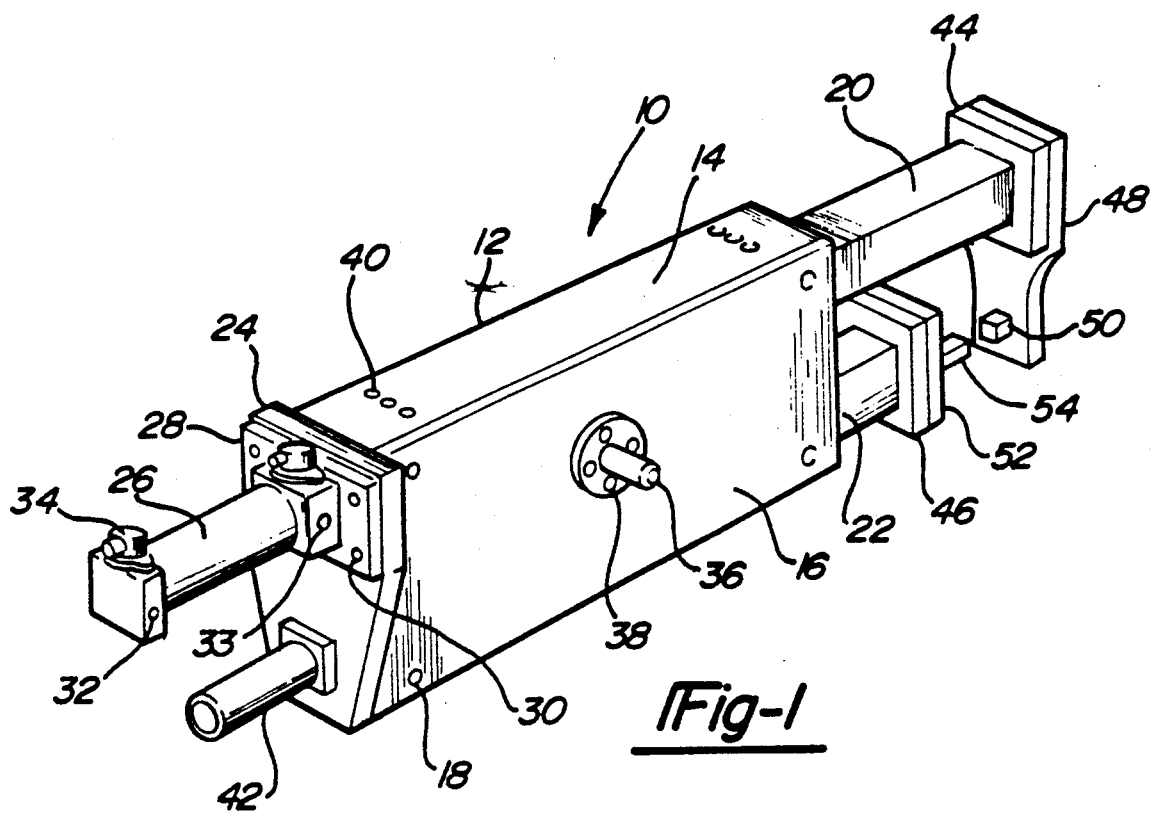
FIG. 1 is a perspective view that shows the dual action apparatus of the present invention.

Referring now to the drawings and more particularly to FIG. 1, there is illustrated in perspective a dual action apparatus 10 in the form of a self-equalizing work tool.

FIG. 1 shows a tool that is adapted for a top support such as suspension from a cable system, or a pivotable side mount system. A platform or floor suspension system of the present invention will be described hereinafter.

With reference to FIG. 1, a housing block 12 of the overall apparatus 10 is shown in elongated form. The housing block 12 is essentially of a two part construction in that a milled portion 14 contains a cover plate 16 attached by a plurality of fasteners, such as bolts 18. The assembly formed by the milled portion 14 and the cover plate 16 contains a top elongate arm 20 and a bottom elongate arm 22 positioned juxtaposed thereto. The top and bottom elongate arms 20 and 22 are positioned longitudinally within the housing block 12 and are spaced from one another in generally parallel relationship. An end cap 24 is attached to one end of the housing block 12 by fasteners (not shown). The end cap 24 not only prevents the ingress of dirt into the interior of the overall apparatus 10, but the end cap 24 also serves as a mounting plate for a power source, such as a fluid actuated cylinder 26. The fluid actuated cylinder 26 contains a flange 28 that is bolted to the exterior of the end cap 24 with bolts 30. The fluid actuated cylinder 26 has a plurality of fluid coupling ports 32 and 33 that permit the introduction of a fluid medium to both sides of a piston that is integral with the fluid actuated cylinder 26. The fluid actuated cylinder 26 is also equipped with a pair of position sensors 34. Since the fluid actuated cylinder 26 must have communication with the interior of the housing block 12, an aperture 35 is provided in the end cap 24 (as best shown in FIG. 2). A pivotal support member 36 is attached to each side of the housing block 12 by a plurality of bolts 38. The overall apparatus can be suspended from a flexible support system by utilizing a series of mounting taps 40 that are positioned in the housing block 12. In addition to carrying the fluid actuated cylinder 26, the end cap 24 also has a motion attenuator in the form of a shock absorber 42 attached thereto in cantilevered fashion by fasteners (not shown). In FIG. 1, the top elongate arm 20 contains an attachment plate 44 attached to its free end. In a similar manner, an attachment plate 46 is attached to the free end of the bottom elongate arm 22.

By way of illustration, a clamp bracket 48 is affixed to the attachment plate 44 at the end of the top elongate arm 20. The clamp bracket 48 carries as an attachment or an integral part thereof a clamp pad 50. In a similar manner, the bottom elongate arm 22 has attached at its free end a clamp bracket 52. A clamp pad 54 is attached to the clamp bracket 52 so that the clamp pad 54 is in axial alignment with the clamp pad 50. Other tool combinations such as welding fixtures and punch and die combinations can also be used in place of the clamping arrangement above described.

FIG. 2 is a cross-sectional side view of the overall apparatus 10 that shows the arrangement of the top and bottom elongate arms 20 and 22 and their interrelationship to one another. The milled portion 14 of the housing block 12 contains a top groove 56. The top elongate arm 20 is positioned within the top groove 56. The top groove 56 extends from end to end of the milled portion 14 and has dimensional tolerances such that the top elongate arm 20 can slide freely therein. In a similar manner, the housing block 12 contains a bottom groove 58 that extends over the longitudinal expanse of the milled portion 14 and is oriented generally parallel to the top groove 56. The bottom elongate arm 22 also slides freely within the confinement of the bottom groove 58. Thus, the top and bottom grooves 56 and 58 provide guides for the top and bottom elongate arms 20 and 22.

The top elongate arm 20 is generally rectangular in cross-sectional configuration. One side of the top elongate arm 20 contains an array of teeth 60 in the form of a rack gear 62. In a similar manner, the bottom elongate arm 22 also contains an array of teeth 64 in the form of a rack gear 66.

A cylindrical bore 68 is located in the center of the milled portion 14. The cylindrical bore 68 is oriented transversely with respect to the axial extent of the top and bottom elongate arms 20 and 22. A pinion gear 70 is positioned within the cylindrical bore 68. The pinion gear 70 is contained on a pinion shaft 72 that is journaled in the milled portion 14 and the cover plate 16. The pinion gear 70 can be either fixed on the pinion shaft 72 so that it rotates simultaneously therewith or the pinion gear 70 can rotate about the pinion shaft 72. The pinion gear 70 is equipped with an arcuate array of teeth 74 that circumscribes the pinion gear 70. The teeth 74 of the pinion gear 70 are meshed with the teeth 60 and 64 of the respective top and bottom elongate arms 20 and 22.

The fluid actuated cylinder 26 is attached to the housing block 12 so that its longitudinal axis 76 coincides with the longitudinal axis of the top elongate arm 20. The fluid actuated cylinder 26 has a cylinder rod 78 that is extendible from one end thereof. The end of the cylinder rod 78 has attached thereto a fitment 80. The fitment 80 has a reduced section or neck 82 adjacent to an enlarged head 84 that is cylindrical in configuration. The actual coupling of the fitment 80 to the top elongate arm 20 will be discussed hereinbelow. The shock absorber 42 is attached to the end cap 24 by appropriate fasteners (not shown). An aperture 86 extends through the end cap 24 and a portion of the shock absorber 42 is installed therethrough. The shock absorber 42 has a cantilevered plunger rod 88 that extends through the aperture 86 toward the end of the bottom elongate arm 22. The plunger rod 88 is biased toward an extended position under the influence of a compression spring 90. The outboard end of the compression spring 90 rests against a head section 92. The head section 92 has a overall diameter that is considerably larger than the diameter of the plunger rod 88 and slightly larger than the diameter of the compression spring 90.

Attention is now directed toward the right-hand side of FIG. 2. A cantilevered end 94 of the top elongate arm 20 has the attachment plate 44 coupled thereto by bolts 96. A collapsible shield 98 is attached to the attachment plate 44 and to the housing block 12 by fasteners (not shown). The collapsible shield 98 can be of metallic construction or a high temperature fiber composite or a combination of both. The main purpose of the collapsible shield 98 is to protect the surface of the top elongate arm 20 from particulate matter, such as the airborne fallout from an adjacent welding operation. The bottom elongate arm 22 is likewise protected at its cantilevered end 100 by a collapsible shield 98. As depicted in FIG. 2, the attachment plate 46 is firmly attached to the end 100 of the bottom elongate arm 22 by bolts 102. In order to provide a positive stop for the top and bottom elongate arms 20 and 22, a stop block 104 is attached to a center section 108 of the milled portion 14 of the housing block 12 by fasteners (not shown). Thus, the stop block 104 serves to limit the retractable movement of both the top and bottom elongate arms 20 and 22.

FIG. 3 is a top plan view of the overall apparatus 10 that is shown in FIG. 2. The position sensors 34 are shown at each end of the fluid actuated cylinder 26. The position sensors 34 are attached to the fluid actuated cylinder 26 by means of bolts 106. The series of mounting taps or tapped holes 40 are positioned in vertical alignment at each end of the housing block 12. The tapped holes 40 provide means for attaching a vertical lift mechanism, such as a cable sling, that would be utilized during production use of the overall apparatus 10.

Figure 4:
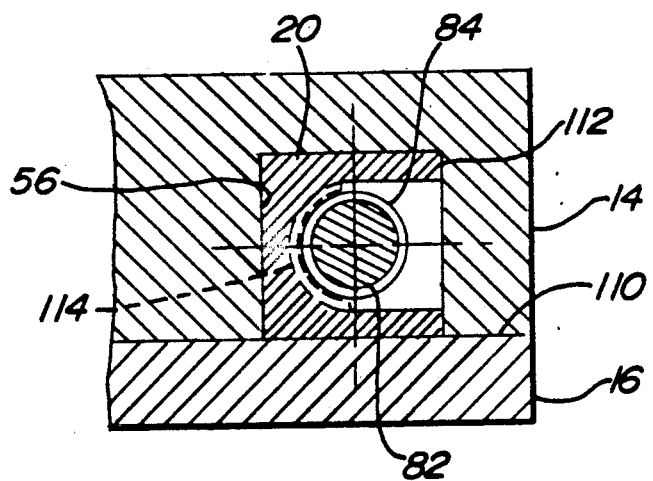
FIG. 4 is a fragmented cross-sectional view taken along section lines 4—4 of FIG. 3 that shows the coupling between the cylinder rod and the elongate arm.

FIG. 4 is a fragmented cross-sectional view taken along the section lines 4—4 of FIG. 3. The milled portion 14 is shown with the top thereof at the right-hand side of FIG. 4. The top elongate arm 20 is shown in position within the top groove 56. The top elongate arm 20 is held captive within the top groove 56 by means of the cover plate 16. However, the cover plate 16 does not interfere with the axially slidable feature of the top elongate arm 20 within the top groove 56. The end of the top elongate arm 20 adjacent the fluid actuated cylinder 26 has a milled slot 110 that extends downward from a top surface 112 of the top elongate arm 20 to a position past the longitudinal axis 76. The bottom of the milled slot 110 is undercut to provide a reentrant section 114. The reentrant section 114 provides a ledge for interaction with the head 84 of the fitment 80. This arrangement provides for rapid connection of the fluid actuated cylinder 26 and its cylinder rod 78 to the end of the top elongate arm 20. As the top elongate arm 20 is moved to an extended position, the head 84 of the fitment 80 pushes against the end of the top elongate arm 20 in a positive manner. When the direction of motion of the top elongate arm 20 is reversed or retracted, the enlarged head 84 of the fitment 80 engages the reentrant section 114 of the milled slot 110, therefore, providing a positive engagement. Thus, it becomes evident that the fitment 80 acts as a quick disconnect coupling.

Figure 5:
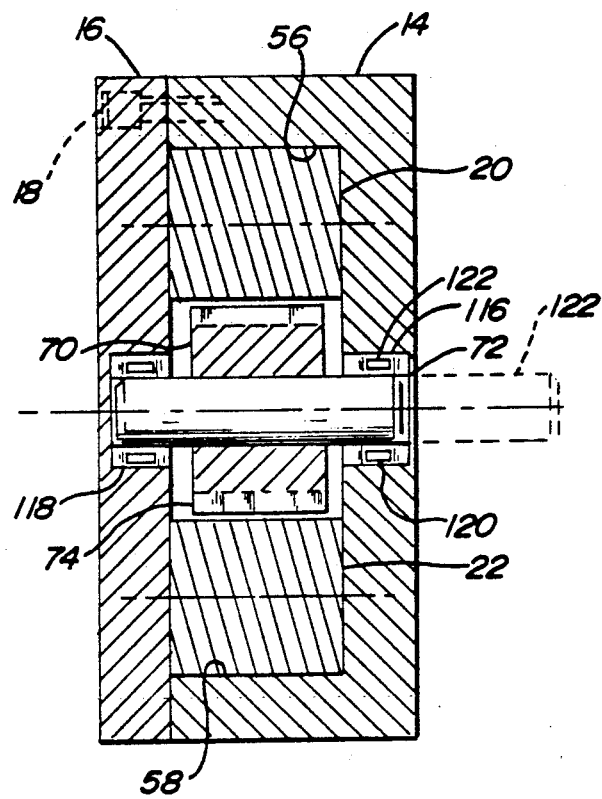
FIG. 5 is a cross-sectional view taken along section lines 5—5 of FIG. 2 that shows the pinion gear, its support shaft and the elongate arms within their respective arm guides.

FIG. 5 is a cross-sectional view taken along the section lines 5—5 of FIG. 2. The housing block 12, which is formed by the coupling of the milled portion 14 and the cover plate 16, is depicted with the top and bottom elongate arms 20 and 22 within the respective top and bottom grooves 56 and 58. The pinion shaft 72 is journaled at one end in a bore 116 which is located in the sidewall of the milled portion 14 and is journaled at the other end in a bore 118 which is located in the cover plate 16. The pinion shaft 72 can be cradled in needle bearings 120, as depicted, or in the alternate sleeve bearings may be utilized. The pinion gear 70 can be fixed to the pinion shaft 72 by means of a key or other immobilization techniques. In the embodiment shown in FIG. 5, the pinion shaft 72 need not be attached to the pinion gear 70; however, when the pinion shaft is extended in length as depicted by the dotted lines associated with an extended pinion shaft 122, the extended pinion shaft 122 must rotate with the pinion gear 70. As will be seen in FIG. 7, the extended pinion shaft 122 is used to rotate an additional gear.

Figure 6:
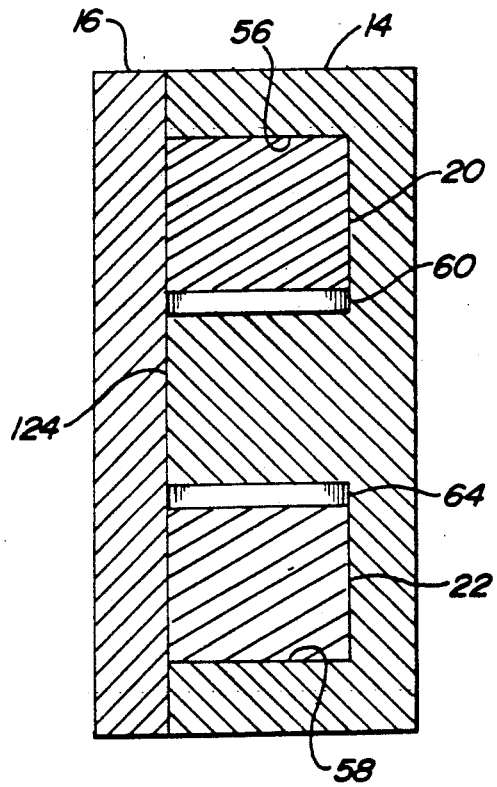
FIG. 6 is a cross-sectional view taken along section lines 6—6 of FIG. 2 that shows the two piece configuration of the housing block.

FIG. 6 is a cross-sectional view taken along the section lines 6—6 of FIG. 2. The milled portion 14 is shown with the top groove 56 and the bottom groove 58 milled therein. As previously pointed out, the top and bottom grooves 56 and 58 provide slideways for the top and bottom elongate arms 20 and 22. A rib 124 remains within the milled portion 14 after the top and bottom grooves 56 and 58 have been milled. The rib 124 is continuous from end to end of the milled portion 14 except for the cylindrical bore 68 that accommodates the pinion gear 70. The rib 124 provides extra rigidity for the overall apparatus 10.

Figure 7:
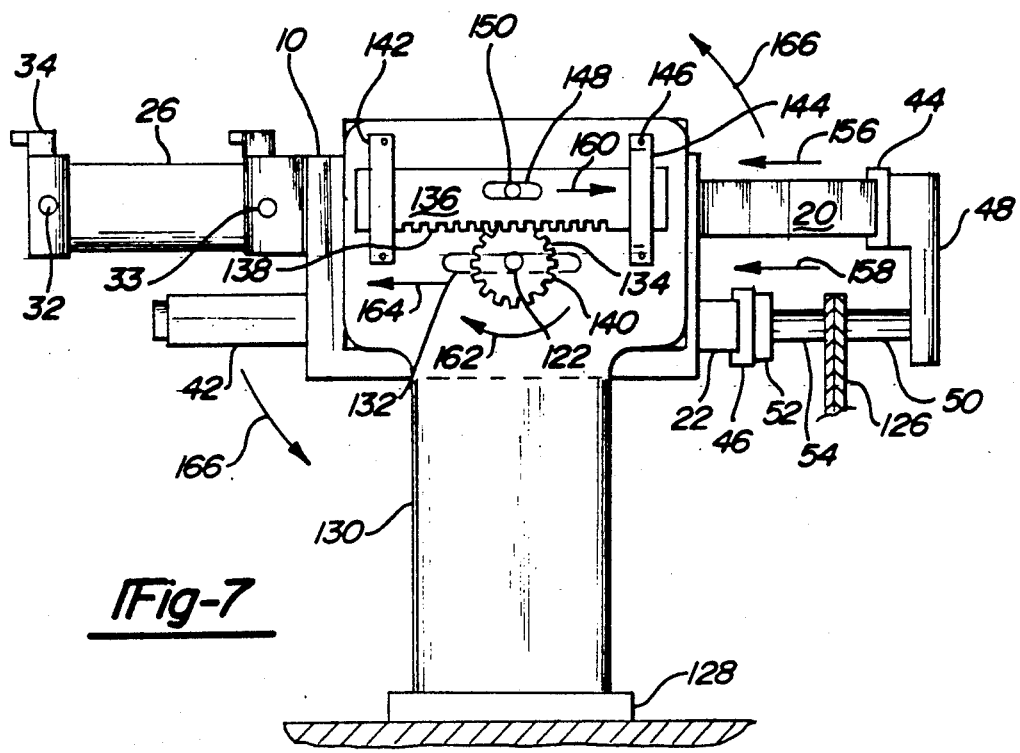
FIG. 7 is a simplified side view of the present invention that permits the apparatus to move into and out of engagement with a workpiece.

FIG. 7 is a simplified side view of the present invention that enhances the mobility of the overall apparatus 10. The overall apparatus 10 is shown with the clamp bracket 48 attached to the free end of the top elongate arm 20. The clamp pad 50 is shown in its generally horizontal attitude. Likewise, the clamp bracket 52 is attached to the free end of the bottom elongate arm 22. A workpiece 126 is shown between the clamp pads 50 and 54. Immobilization of the workpiece 126, whether it is a single unit or a plurality of units, is important to the accurate positioning of welds, crimps, drilled holes and similar production manipulative operations. After a given operation is performed on the workpiece 126, it is important to be able to remove the tools therefrom.

In order to enhance the mobility of the overall apparatus, it has been provided with base support structure as shown in FIG. 7. A base plate 128 is anchored to a solid substrate. A pair of support plates 130 are cantilevered in a vertical direction from the base plate 128. The support plates 130 are spaced one from the other in order to provide adequate room for the overall apparatus to fit therebetween. The extended pinion shaft 122 extends through a slot 132 that is positioned in at least one of the support plates 130. A drive gear 134 is attached to the end of the extended pinion shaft 122. The drive gear 134 and the internally positioned pinion gear 70 are both fixed so that they rotate in unison with the extended pinion shaft 122. An externally mounted rack gear bar 136 is positioned so that an array of teeth 138 on the rack gear bar 136 mesh with an arcuate array of teeth 140 spaced around the circumference of the drive gear 134. The rack gear bar 136 is journaled for sliding motion through a pair of brackets 142 and 144. The brackets 142 and 144 are held in position against the exterior of the support plate 130 by bolts 146. A small elongated aperture 148 is positioned in the rack gear bar 136. A pin 150 is attached to the exterior of the support plate 130. The pin 150 extends through the aperture 148 in the rack gear bar 136. The aperture 148 moves freely with respect to the pin 150 and the rack gear bar 136 slides along the surface of the support plate 130.

Assembly and Operation

The assembly of the overall apparatus 10 of the present invention is not complicated which is an asset when repairs must be performed. The top elongate arm 20 and the fluid actuated cylinder 26 are coupled by installing the head 84 of the fitment 80 into engagement with the milled slot 110. The top elongate arm 20 is then inserted into the top groove 56 and the flange 28 of the fluid actuated cylinder 26 is attached to the end cap 24 by means of the bolts 30. The shock absorber 42 is likewise attached to the end cap 24. The bottom elongate arm 22 is installed in the bottom groove 58. The top and bottom elongate arms 20 and 22 are positioned as shown in FIG. 2, then the pinion gear 70 and the pinion shaft 72 are installed with care being taken to assure proper meshing of the teeth 60, 64 and 74. The cover plate is then secured by the installation of the bolts 18. The protective shields 98 are then telescoped over each of the cantilevered ends 94 and 100 of the top and bottom elongate arms 20 and 22. The shields 98 are held in place by fasteners (not shown).

During the operation of the overall apparatus 10, with the illustrative clamp tooling shown in FIG. 1, the top elongate arm 20 is moved to an extended position as shown in FIGS. 2 and 3. The movement of the top elongate arm 20 is achieved by the introduction of a fluid medium, such as air or oil, through the fluid coupling port 32. This of course creates a desirable pressure behind the piston head within the fluid actuated cylinder 26. The pressure created by the ingress of the fluid medium behind the piston within the fluid actuated cylinder 26 causes an extension of the cylinder rod 78. As the cylinder rod 78 moves to an extended position, the top elongate arm 20 also moves until it reaches its maximum extent as depicted in FIGS. 2 and 3. The rack gear 62 also moves with the top elongate arm 20. The rack gear 62 causes rotation of the pinion gear 70 which in turn causes the bottom elongate arm 22 to move in a direction opposite to the movement of the top elongate ar 20. As the bottom elongate arm 22 nears the end of its travel to the left, as viewed in FIG. 2, its end contacts the head section of the plunger rod 88. The metered resistance afforded by the shock absorber 42 prevents a sudden stop in the movement of the top and bottom elongate arms 20 and 22. When it becomes necessary to reverse the direction of travel of the top and bottom elongate arms 20 and 22, a fluid medium is then introduced to the fluid actuated cylinder 26 through the fluid coupling port 33. The fluid medium thus introduced to the front of the piston within the fluid actuated cylinder causes a retraction of the cylinder rod 78. The top elongate arm 20 follows the cylinder rod 78 because of the aforementioned coupling. The top elongate arm 20 moves toward the left as viewed in FIG. 2 until its attachment plate 44 has reached the dotted location 152. The movement of the top elongate arm 20 causes an equal and opposite travel in the bottom elongate arm 22. At the end of its travel, the attachment plate 46 reaches a terminal position depicted by the dotted location 154.

In the embodiment of the present invention shown in FIG. 7, a way has been devised to move the overall apparatus 10 away from any possible interference with a workpiece as it is moved into and out of a work station. The overall apparatus 10 is shown in FIG. 7 in the fully clamped position, that is, the clamp pads 50 and 54 are in compressive contact with the workpiece 126. After the particular work function has been performed on the workpiece 126, the overall apparatus 10 must be disengaged from the workpiece 126. As a fluid medium is introduced to the fluid actuated cylinder 26 through the fluid coupling port 32, the top elongate arm 20 begins to move to the right in the direction of the arrow 156. During this initial movement of the top elongate arm 20, the bottom elongate arm 22 also moves away from the workpiece 126 as depicted by the arrow 158. Also, during the initial movement of the top elongate arm 20 the pinion gear 70 is caused to rotate. Since the pinion gear 70, the extended pinion shaft 122, and the drive gear 134 are coupled together in a rigid subassembly, the rotation of the pinion gear 70 causes a similar rotation in the drive gear 134.

The rotation of the drive gear in a clockwise direction as depicted by arrow 162 causes the rack gear bar 136 to move toward the right or in the direction of arrow 160. The rack gear bar 136 has the freedom of slight lateral movement because of the pin 150 and the aperture 148 arrangement. The free travel of the rack gear bar 136 stops as the left-hand end of the aperture 148 engages the pin 150. Since the rack gear bar 136 can no longer travel in the direction of the arrow 160, the continued revolving of the drive gear causes it to begin translating or moving in the direction of the arrow 164.

As the drive gear begins to translate, the extended pinion shaft 122 also moves along the slot 132. Thus, the entire overall apparatus 10 moves to the left with respect to the workpiece 126. As the overall apparatus 10 moves to the left, it can be further removed from the vicinity of the workpiece 126 by rotating the overall apparatus 10 in the direction of arrows 166 about its extended pinion shaft and accompanying external support, such as the pivotal support member 36 as shown in FIG. 1.

While the illustrative embodiments of the present invention have been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. A dual action apparatus for the manipulation of a plurality of tools comprising:
    a housing block having two spaced apart elongate arm guides provided therethrough, said elongate arm guides being in communication with each other over a length of their central portion;
    a first elongate arm disposed in one of said elongate arm guides with one of its ends protruding from said housing block and the other end of said first elongate arm detachably coupled to a linearly displaceable power source;
    a second elongate arm disposed in the other of said two elongate arm guides with one of its ends protruding from said housing block and the other end of said second elongate arm in contact with a motion attenuator;
    an end cap positioned over one end of said housing block, said power source and said motion attenuator being attached to said end cap;
    a rack gear coupled to each of said first and second elongate arms, each of said rack gears having a linear orientation along a portion of the axial extent of said first and second elongate arms;
    a pinion gear disposed within said housing block and in engagement with said rack gears; and
    means for attaching a tool to each of said first and second elongate arms so that said apparatus can perform useful work on a workpiece.

2. The apparatus of claim 1 wherein said power source is in the form of a fluid actuated cylinder that is attached externally to said end cap, with a cylinder rod extending through said end cap and coupled to said first elongate arm.

3. The apparatus of claim 1 wherein said motion attenuator is in the form of a shock absorber that is attached externally to said end cap with a plunger rod extending through said end cap and in abutment with an end of said second elongate arm.

4. The apparatus of claim 1 wherein said coupling between said power source and said first elongate arm is in the form of a quick disconnect coupling that can transmit tension and compression loads.

5. The apparatus of claim 1 wherein said means for attaching a tool are on the ends of said first and second elongate arms complementary to one another in opposed axial alignment to permit the inclusion of said workpiece therebetween.

6. The apparatus of claim 1 wherein a telescoping shield circumscribes said protruding ends of said first and second elongate arms.

7. The apparatus of claim 1 wherein said housing block has coupled externally thereto a plurality of pivotal support members for support and rotation of said apparatus.

8. The apparatus of claim 1 wherein stop means common to both said first and second elongate arms is attached to the exterior of said housing block.

9. The apparatus of claim 8 wherein said stop means is in the form of a block.

10. The apparatus of claim 1 wherein a pinion shaft is used to support said pinion gear and said pinion shaft is journaled within the confinement of said housing block, providing a smoother exterior for said apparatus.

11. The apparatus of claim 1 wherein a plurality of position sensors are coupled to said power source so that the position of said first and second elongate arms can be monitored.

12. The apparatus of claim 1 wherein said elongate arm guides are of rectangular cross-sectional configuration and throughout their axial extent said elongate arm guides are parallel to one another.

13. A dual action apparatus for the manipulation of a plurality of tools comprising:
    a housing block having two-spaced apart elongate arm guides provided therethrough, said elongate arm guides being in communication with each other over a length of their central portion, said elongate arm guides each having a rectangular cross-sectional configuration throughout their axial extent, said elongate arm guides being oriented parallel to one another;
    a first elongate arm disposed in one of said elongate arm guides with one of its ends protruding from said housing block and the other end of said first elongate arm coupled by means of a quick disconnect fitment to a linearly displaceable power source;
    a second elongate arm disposed in the other of said two elongate arm guides with one of its ends protruding from said housing block and the other end of said second elongate arm being in contact with a motion attenuator over at least a portion of the travel of said second elongate arm;
    an end cap positioned over one end of said housing block, said power source and said motion attenuator being attached to said end cap;
    a rack gear coupled to each of said first and second elongate arms, each of said rack gears having a linear orientation along a portion of the axial extent of each said first and second elongate arms;
    a pinion gear disposed within said housing block and in engagement with said rack gears, said pinion gear supported for rotation on a pinion shaft that is oriented transversely with respect to the longitudinal axes of said first and second elongate arms;
    a pair of support plates positioned adjacent each side of said housing block, said pair of support plates being anchored to a common base plate; at least one of said pair of support plates having an elongated slot therein that is generally parallel to said base plate; said pinion shaft extending through said elongated slot and attached to a drive gear; said pinion gear, said pinion shaft and said drive gear being rigidly coupled together;

a rack gear bar mounted adjacent to and intermeshed with said drive gear, said rack gear bar being supported by and in sliding engagement with one support plate of said pair of support plates;

a pin mounted in and cantilevered from one support plate of said pair of support plates, said pin being positioned so that it passes through an elongated aperture in said rack gear bar; and a plurality of attachment plates coupled to the free ends of said first and second elongate arms so that tools may be affixed thereto for performing work on a workpiece.

14. The apparatus of claim 13 wherein said power source is in the form of a fluid actuated cylinder that is attached externally to said end cap and removably coupled to said first elongate arm, said power source having a plurality of position sensors coupled thereto.

15. The apparatus of claim 13 wherein said rack gear bar is positioned in sliding engagement with the exterior of one support plate of said pair of support plates by a plurality of brackets.

16. The apparatus of claim 13 wherein said motion attenuator is in the form of a shock absorber that is attached externally to said end cap with a plunger rod extending through said end cap and in abutment with an end of said second elongate arm, said shock absorber utilizing a compression spring to urge said plunger rod to an extended position.

17. The apparatus of claim 13 wherein said coupling between said power source and said first elongate arm is in the form of a quick disconnect coupling that can transmit tension and compression loads, said quick disconnect coupling comprising a reentrant section formed in the end of said first elongate arm and a fitment that contains a head compatible with said reentrant section.

18. The apparatus of claim 13 wherein said elongate arm guides are of rectangular cross-sectional configuration and throughout their axial extent said elongate arm guides are parallel to one another.

19. The apparatus of claim 18 wherein at least a section of each said elongate arm guides is formed by a cover plate that is common to both of said elongate arm guides.

* * * * *

UNITED STATES PATENT AND TRADEMARK OFFICE
CERTIFICATE OF CORRECTION

PATENT NO.  : 5,027,909
DATED       : July 2, 1991
INVENTOR(S) : Carter et al

It is certified that error appears in the above-identified patent and that said Letters Patent is hereby corrected as shown below:

Column 1, line 51, delete "t" and insert ---- to ----.

Column 1, line 65, delete "ma" and insert ---- may ----.

Column 2, line 42, delete "ar" and insert ---- arm ----.

Column 2, line 67, delete "o" and insert ---- or ----.

Column 5, line 41, delete "a" (second occurrence) and insert ---- an ----.

Column 8, line 16, delete "ar" and insert ---- arm ----.

Signed and Sealed this

Seventeenth Day of November, 1992

Attest:

DOUGLAS B. COMER

*Attesting Officer*   Acting Commissioner of Patents and Trademarks